United States Patent [19]

Baron

[11] Patent Number: 5,432,242
[45] Date of Patent: Jul. 11, 1995

[54] HP CATALYST KILLER

[75] Inventor: Norbert Baron, Lint, Belgium

[73] Assignee: Exxon Chemical Patents Inc., Wilmington, Del.

[21] Appl. No.: 107,741

[22] PCT Filed: Feb. 19, 1992

[86] PCT No.: PCT/EP92/00377
§ 371 Date: Aug. 23, 1993
§ 102(e) Date: Aug. 23, 1993

[87] PCT Pub. No.: WO92/14766
PCT Pub. Date: Sep. 3, 1992

[30] Foreign Application Priority Data

Feb. 20, 1991 [GB] United Kingdom ............... 9103527

[51] Int. Cl.$^6$ ................................ C08F 2/40
[52] U.S. Cl. ........................... 526/68; 526/82; 526/83; 526/84; 526/85
[58] Field of Search .............. 526/82, 83, 84, 85, 526/68

[56] References Cited

U.S. PATENT DOCUMENTS

| | | | |
|---|---|---|---|
| 4,701,489 | 10/1987 | Hughes et al. | 524/349 |
| 4,719,270 | 1/1988 | Miwa et al. | 526/68 |
| 5,066,736 | 11/1991 | Dumain et al. | 526/82 |

FOREIGN PATENT DOCUMENTS

| | | |
|---|---|---|
| 0035242B1 | 9/1981 | European Pat. Off. |
| 0116917A1 | 2/1984 | European Pat. Off. |
| 0071252B1 | 10/1985 | European Pat. Off. |
| 0162274A1 | 11/1985 | European Pat. Off. |
| 0260999A1 | 3/1988 | European Pat. Off. |
| 0328348A2 | 8/1989 | European Pat. Off. |
| 0308177B1 | 7/1992 | European Pat. Off. |
| 0140131A2 | 9/1994 | European Pat. Off. |
| 26089930 | 9/1977 | Germany . |
| 3127133A1 | 1/1983 | Germany . |
| 3150270A1 | 6/1983 | Germany . |

Primary Examiner—Joseph L. Schofer
Assistant Examiner—Tom Weber
Attorney, Agent, or Firm—Darrell E. Warner

[57] ABSTRACT

A process for preparing olefinic polymers by metallocene catalyzed olefin polymerisation in which at least one volatile catalyst kill agent is introduced. A non-volatile catalyst kill agent may also be used in conjunction with the volatile catalyst kill agent. Water may be used as the volatile agent and compounds containing a terminal hydroxy group, oxygen, nitrogen or sulfur may constitute the non-volatile agent. Purified monomer is recycled to the reactor.

35 Claims, 1 Drawing Sheet

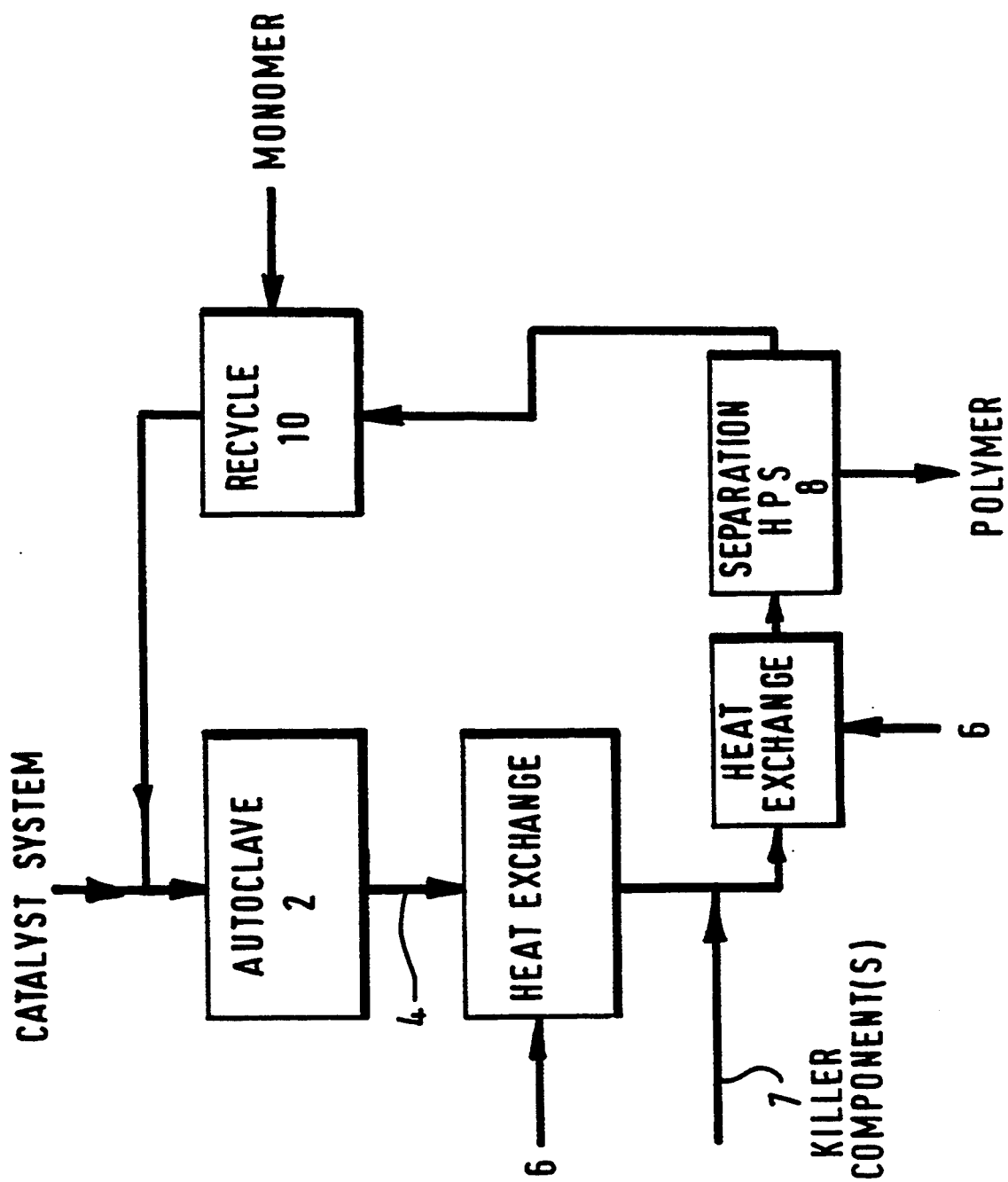

HP CATALYST KILLER

FIELD OF INVENTION

The invention relates to processes for polymerizing olefins using metallocenes and in particular to catalyst killing systems for use in such processes. The term catalyst killing refers to the deactivation of the catalyst. The deactivation may be a partial or complete suppression of polymerisation appropriate to enable the overall process to be performed in a stable manner.

BACKGROUND OF THE INVENTION

It is known to use low molecular weight gases or liquids in order to kill Ziegler-Natta catalyst systems to reduce the catalyst system activity to a level where the polymerisation stops. Ziegler-Natta catalyst systems usually employ a titanium chloride transition metal component and an aluminum alkyl co-catalyst component or activator.

EP 116917 (Ruhrchemie) for example describes a killer of $CO_2$ and alcohols. These products are said to react with catalyst to form non-volatile compounds, not active in polymerization.

The use of water as a Ziegler-Natta catalyst killer is disclosed in U.S. Pat. No. 4,701,489 (El Paso). However whilst water is a known effective catalyst killer, acid may evolve and at high levels corrosion may be caused.

It is also known to use high molecular weight products (polyglycols; epoxides; ethylene copolymers; organic titanium compounds; alkoxysilanes; peroxides; zeolites as a water carrier; or surface-active agents) as Ziegler-Natta catalyst killers.

EP 162274 (Ruhrchemie) discloses a high pressure Ziegler-Natta catalyzed polymerization process involving deactivation with an oxygen-containing waxy ethylene copolymer. The purpose is to prevent polymerization of residual monomer in the separator and gas circulating system. EP 140131 (Ruhrchemie) uses polyglycols for similar purposes.

DE-3322329 (Mitsubishi Petrochemical) discloses killers of peroxides which break up into a complex mixture of volatile $CO_2$ and other mainly volatile components.

It is further more known from JP-A-57158206 (Sumitomo) to use in a slurry polymerization process a mixture of water, sorbitan alkyl ester, and an aliphatic $C_3$-$C_8$ hydrocarbon as catalyst killer to avoid use of a large amount of water, presumably by using the sorbitan alkyl ester to emulsify the water in the $C_3$-$C_8$ solvent. EP-B-71252 (Sumitomo) discloses use of a suspension of water containing fatty acid salt in a hydrocarbon for a similar purpose. The fatty acid salt may act to neutralise acids formed by the water-catalyst reaction.

In recent years use of metallocene based polymerisation catalyst systems using metallocenes as the transition metal component has been suggested; generally using alumoxane as a cocatalyst. For the purpose of this text the term Ziegler-Natta catalyst systems is used to exclude metallocene/alumoxane systems. The metallocene based systems employ relatively small, molecules of generally unsupported (particularly in high pressure processes) metallocene transition metal components which can have a significant, although still low, vapor pressure at conditions for separation of polymer and unreacted monomer. The cocatalyst has generally a much higher molecular weight than conventional aluminumalkyl cocatalysts and may be an alumoxane as afore mentioned or other suitable cocatalyst complex. However these compounds may still have an appreciable vapor pressure at separation conditions. Often the cocatalyst is used in great excess over the metallocene but the overall catalyst system has a high activity so that catalyst concentrations can be low.

EP-35242 (BASF) uses methanol as a catalyst killer for such metallocene/alumoxane systems; DE 3127133 (Hoechst) uses n-butanol.

Metallocene/alumoxane based catalyst systems have been proposed in which water is introduced into the polymerization zone to create alumoxane in situ (See DE 2608933 Kaminsky; Exxon EP 308177). EP 308177 (Exxon) uses water in the monomer feed to activate, not deactivate, TMA separately introduced as part of the catalyst system.

EP 328348 (Mitsui Petrochemical) uses water in addition to alumoxane and optionally an organoaluminum compound to improve catalysis in low pressure conditions with water (See Example 1 of EP 328348) used to kill catalyst activity. However no elevated pressure is used and there is no recycling because the polymerisation in Example 1 is a batch procedure.

These metallocene based catalyst systems may be used in high pressure polymerisation (See EP 260999 and DE 3150270) including continuous processes involving a recycling and recompression of unreacted monomer.

In industrial-scale high pressure polymerisation a monomer feed is supplied continuously by a compressor installation, polymerised under pressure in a tubular or autoclave reactor, then removed and supplied to a separation stage which may involve high and low pressure separation whereupon polymer is isolated and unreacted monomer is recycled. The extent of recycling can vary depending on the reactivity and amount of comonomers.

The killing of metallocene based catalyst systems in elevated pressure systems with recycled monomer streams may be especially critical. Residual catalyst activity may occur in the separation and in the recycle system; catalyst activity may be highly sensitive to residual killer present in polymerisation. The amount of catalyst system and killer injected need to be appropriately controlled.

It is the object of the invention to provide a commercially viable catalyst killing technology to provide sustained, controllable polymerization with high activity metallocene catalyst systems in fluid systems such as high pressure polymerisation. It is a further object to maintain the specific advantages of metallocene catalyst systems such as the capability of producing narrow molecular weight distribution (MWD), and/or narrow compositional distribution (CD) of the polymer products and high productivity of the catalyst system.

In particular it is amongst the objects of the invention to provide a catalyst killing technology which provides a quick killing reaction; reduces or avoids polymerization in the high pressure separator stage, and reduces or avoids polymerization of the monomer during recycle. It is furthermore amongst the objects to reduce and minimise suppression of the polymerization reaction resulting from carry over of the killer components in the recycled feed to the reactor. It is also one of the possible objects to provide a killer system which can be adapted easily to varying process requirements for producing different polymers of different molecular weights as well as different comonomer types and content at different polymerisation and elevated pressure separation conditions whilst making efficient use of the catalyst system.

SUMMARY OF THE INVENTION

The invention is related to processes for preparing olefinic polymers including the steps of:

(a) continuously feeding olefinic monomer and a catalyst system of a metallocene component and a cocatalyst component to a reactor;

(b) continuously polymerising the monomer in a polymerisation zone in the reactor under elevated pressure;

(c) continuously removing a monomer/polymer mixture from the reactor;

(d) continuously separating monomer from molten polymer at a reduced pressure to form a monomer-rich and a polymer-rich phase; and (e) recycling separated monomer to the reactor.

The term "olefinic monomer" includes generically copolymerisable monomers or blends of two or more olefins or diolefins or polyolefins as well as monomer feeds consisting substantially of one olefin. The term is used herein to include all compounds capable of addition polymerisation or copolymerisable with ethylene such as cyclic olefin; norbornenes; styrene, alkyl substituted styrenes and vinylsilanes.

The recycling is advantageously direct that is to say the monomer-rich phase is returned to the polymerization zone without the necessity of additional separation or purification steps.

In a first aspect of the invention there is used in combination with the process set out above, both a volatile killer component and a non-volatile catalyst system killer component. The terms volatile and non-volatile are used in the context of the separation conditions. The volatile component may tend to predominate in the phase to be recycled; the non-volatile killer components tends to concentrate predominantly in the polymer. The separation of polymer; oligomer and monomer is not perfect. The volatile killer components will also be present in the polymer to some degree at separation for example perhaps by entrainment by the heavy component. By using the killer components polymerisation activity in the polymer phase can be suppressed. The volatile component flow rate can be adjusted easily to achieve the dual objective of (a) suppressing polymerisation in the recycle and (b) avoiding undue reductions in catalyst activity in polymerisation.

Advantageously the non-volatile component is nondecomposable and thermally stable at the separating conditions to avoid unpredictable entrainment of residues in the recycle.

Preferably the non-volatile killer component is added in a ratio of from 0.01 to 10 moles of non-volatile killer component per mol of metal (metallocene and cocatalyst), preferably from 0.05 to 2. The non-volatile killer component may however also consist of or comprise compounds which are decomposable and for example release by disassociation an oxygen containing compound, preferably a compound containing terminal hydroxy groups to provide a killing action.

Preferably the volatile killer component is thermally stable at separating and recycle conditions so that only a single volatile species is present whose behaviour is predictable.

The volatile killer component may be water. The term "water" as used herein also covers compounds which can decompose to yield water such as hydrogen peroxide and analogous isotope derived materials such as $D_2O$ (deuteriumoxide). Advantageously the volatile and non-volatile components are admixed for common introduction into the reactor effluent streams, preferably in the form of a solution or micro-emulsion which may be formed with the aid of additional solvent.

Suitably at least the volatile component is added in a killer reaction zone upstream of a high pressure letdown valve although it may also be added downstream.

In a second aspect applicable to the general aspect (a) to (e) provides, in combination with the process set out above, the addition of water as a volatile killer component. Water may possibly be added in amounts which are equal to or preferably exceed those needed to kill residual catalyst activity in the recycle and so may be dosed in a greater range of concentrations and/or be effective to kill the catalyst system in the separated polymer at least to some extent. Water may be used in appropriate circumstances without using a non-volatile killer component. The term "water" also includes precursor and isotope equivalents such as $H_2O_2$ and $D_2O$ as discussed above.

It is believed that water used in excess acts an effective catalyst killer but, when water residue re-enters the reactor and is present in a much lower proportion relative to newly introduced catalyst system, water has little negative or may even have a positive effect on catalyst system productivity. Formation of hydrogen chloride or of other corrosive chlorine compounds can be kept low as the amounts of water used are low. The water which is in excess to that needed to react with alumoxane may have different beneficial effects which reflect in preserved or apparent increased productivity. The following represent possible hypotheses for these surprising beneficial effects. Excess water may react with surplus volatile TMA contained in commercial methyl alumoxane to make additional cocatalytically active or inactive product. Excess water may also gradually react with other impurities including alkylaluminum to provide reaction products which can be more easily rendered non-volatile and purged from the system.

It is hence believed that the volatile and/or non-volatile killer scavenges volatile catalyst and cocatalyst components and reduces consequential undesirable modification of the catalyst activity after recycling of such components.

Preferably the cocatalyst component includes an aluminum alkyl capable of hydrolysing with excess water to produce alumoxane. The aluminum alkyl may be trimethyl aluminum present in catalyst systems. Thus the reaction product not only removes water but may produce additional material which is catalytically useful. The catalyst system may also include alumoxane formed prior to injection into the polymerisation.

Suitably there is additionally added a non-volatile killer component although in certain process configurations water may be used on its own.

The elevated polymerisation pressure for high pressure processes of the invention may be from 50 to 3500 bar, preferably from 300 to 2000 bar and especially from 500 and advantageously from 800 to 1600 bar. Polymerisation may be at a temperature of from 50 to 350° C., preferably from 80° C. to 250° C. and especially from 120° C. to 220° C. It is preferably at least 20° C., especially at least 30° C. above the melting point of the resulting polymer.

The ranges may cover a wide variety of process configurations and raw materials but in each case suitably the process configuration includes a system for directly recycling unreacted monomer, preferably without passing through an additional scavenging step for removing poisons including poisons resulting from unreacted killer component or killer residues.

Preferably water is added in amounts such that the catalyst system is killed sufficiently to permit polymer separation without overheating of separated polymer by residual polymerisation activity, unreacted water being recycled with separated, unreacted monomer. Additionally the catalyst system may contain a component capable of reacting with unreacted water. Advantageously water is added into a killer reaction zone upstream of a high pressure let-down valve and the killer reaction zone is defined by a baffle in a high pressure reaction vessel with one or more polymerisation zones upstream of the killing reaction zone. Preferably monomer and residual water is removed from a low pressure separator and recycled without additional separate water removal from the low pressure separator for feeding to the reactor.

DETAILED DESCRIPTION OF INVENTION

Preferably the metallocene is fed in an amount of from 0.01 to 100 g of metallocene per $10^6$ g of total monomer, preferably from 0.1 to 25 or even 50 g/$10^6$ g of polymer and especially from less than 5 g/$10^6$. The inverse of this ratio may be referred to herein as the metallocene activity. In high pressure polymerisation conversion of monomer to polymer is usually from 10 to 20%. Actual amounts of metallocene used are also influenced by the ratio of metallocene (TM) to cocatalyst (Al), usually methylalumoxane. At high Al/TM mol ratio's, the amount of metallocenes used may be lower. The amount is also influenced by the type of metallocene selected which may be influenced by desired co-monomer incorporation and molecular weight. Typical Al/TM mol ratio's, depending on process needs, for the aforementioned activities are from 100 to 10,000.

Advantageously volatile killer is added in a ratio of 0.005 to 2.5 moles of volatile killer per mol of total metal in the catalyst system, preferably from 0.05 to 1.5 and especially from 0.1 to 1.2.

The killer component proportions can be adapted having regard to the physical process layout and having regard to the metallocene activity which typically varies from 10000 (ten thousand) to 5000000 (five million) grams of polymer product per gram of transition metal compound in the metallocene at an aluminum/transition metal mol ratio of 1000, especially from 50000 (fifty thousand) to 2000000 (two million). The amount and type of comonomer present may also influence the amount of the killer components used.

The optimum levels of each component are to be determined experimentally for each polymerisation and product/monomer separation condition and cocatalyst composition.

The rate of addition of the volatile component normally can be elevated to exceed that needed to kill the catalyst system without depressing the metallocene activity. It can be maximized in a way such that just a minor decrease of catalyst activity due to recycling killer is observed whereupon the killer level is reduced slightly. This ensures the presence of a sufficient amount of killer in the monomer recycle system. With the killer system used in the invention, excessive uncontrolled suppression of catalyst system activity can be avoided, particularly by reducing the above determined amount of killer by from 10 to 20 wt % from the level at which a minor decrease of catalyst activity is observed for continuous operation, combining in this way adequate killing with high catalyst activity.

The rate of addition of the non-volatile component (if used) is minimized in order to keep the killer residues in the product as low as possible. Higher dosing rates may be permissible or even desirable, however, for certain products or for certain product/killer combinations in cases where the killer components contribute to special product properties.

Volatile components for use in combination with non-volatile killer components may be for instance low molecular weight components with a molecular weight of less than 200, preferentially less than 80, containing reactive O, N or S moiety, such as $H_2O$, $CO_2$, CO, $NH_3$, $SO_2$, $SO_3$, $N_2O$; alcohols, diols and triols, ethers, aldehydes, ketones, carboxylic acids and diacids, their anhydrides or esters; amines, amides or imides or hydrogen peroxide, alkyl hydroperoxides. As indicated above the volatile components may be derived by decomposition (such as that of $H_2O_2$) which are themselves volatile.

The volatile components could also include decomposition products of high molecular weight components which can decompose thermally or chemically forming low molecular weight species but this is not preferred. Examples are peroxides, peresters, peroxydicarbonates, percetals, alkyl-hydroperoxides, hydroperoxides; azo compounds such as azo dicarbonamide, azo-bis-isobutyronitrile, azo-bis-dimethyl valeronitrile; or inorganic components such as ammonium carbonate and ammonium hydrogen carbonate.

Components with a half lifetime at reaction conditions of >1 sec may be decomposed prior to injection by preheating or chemical treatment.

The non-volatile killer components may be a component containing reactive O, N or S—moiety typically with a molecular weight higher than 200, preferentially higher than 300. Such oxygen components may be high molecular weight alcohols, phenols diols, polyols, saccharides, ethers, epoxides, aldehydes, ketones, carboxylic acids, diacids and polyacids, their anhydrides, esters or salts, polyalkylene glycols such as polyethylene glycol, amines. As indicated they should preferably be stable, but could also include decomposable compounds such as alkyl hydroperoxides, peroxy acids or peroxides with halflife times higher than 1 min. at reaction conditions. Further reactive alkoxy silanes or siloxanes may be used such as tetraethoxysilane or silanol terminated siloxanes (silicon oils). Nitrogen components which may be used include for example high molecular weight amines, imides and amides such as oleoamide and erucamide and their reaction products with alcohols, carboxylic acids or their anhydrides. Examples of sulfur compounds are thiols or polythiols. The non-volatile component further may be an anorganic compound with a high oxidizing power such as permanganates or chlorates.

Preferably the non-volatile killer component is an oxygen or nitrogen containing compound, especially a compound containing at least one labile hydrogen such as a terminal hydroxy group. The terminal groups are exposed and contribute to effective killing.

The catalyst system may include as metallocene a compound of the general formula

R L M (D)

wherein M is a transition metal of group III B, IV B, V B, VI B of the periodic table, wherein R is a ligand having a conjugated electron bonded to M of which there may be one, two or three such ligand which may be same of different;

wherein L is a leaving group preferably anionic bonded to M of which there may be one, two, three or four depending on the valency of M and the member of other substituents on M; and D is an optional electrondonating hetero atom group.

R may be or include a substituted or unsubstituted cycloalkadienyl group such as cyclopentadiene, indenyl, tetrahydro-indenyl or fluorenyl. Where more than one such cycloalkadienyl group is present, the groups may be bridged (See Exxon EP 129368). Where only one cycloalkadienyl group is present such group may be bridged to other transition metal ligands such as D (See EP 416815 and EP 420436).

L may be or include an aryl group, alkyl group, an aralkyl group, an alicyclic group, a halogen atom, a hetero atom containing ligand containing an oxygen sulfur, nitrogen or phosphorus atom; these groups may be connected by single or multiple bonds to M.

The cycloalkadienyl group hence includes polycyclic structures.

The other catalyst component, generally alumoxane, may be prepared in a pre-reaction and then introduced into the polymerisation system but may also be formed wholly or partly in situ by reaction of water and a trialkylaluminum, preferably trimethylaluminum. In EP 308177 water may be introduced in the monomer feed for this purpose. The Al/transition metal mol ratio may be less than 10000, suitably from 10 to 5000, preferably from 50 to 2000, especially from 200 to 1500.

The killer components may be added separately or together. To maximise effectiveness at the separation stage, they are best added downstream of the polymerization zone before separation, preferably at a high pressure portion upstream of a pressure let-down valve or immediately downstream at a lower pressure portion. Preferably the killer components are added together in admixture. Advantageously the contact time between killer components and polymer before separation is at least 10 seconds, especially at least 20 seconds.

While many of the killer components listed above can be dissolved into inert hydrocarbon solvents, this is not the case with water.

Thus in a further preferred aspect of the invention it has been found that along with water, the second nonvolatile killer component can be selected so as to provide a largely homogeneous solution or a sufficiently stable emulsion in an inert carrier liquid, permitting pumping of the killer components into the system at accurately controlled levels without fouling or plugging of an injection pump or injection line.

In this further aspect of the invention there is hence provided a mixture of from 0.005 to 20 wt %, preferably from 0.025 to 10 wt % of water and an oxygen or nitrogen containing surface active agent such as glycerol mono-oleate (GMO) or sorbitol mono-oleate (SMO) preferably in an amount of from 0.05 to 90 wt % especially 1 to 50 wt % in an organic solvent such as heptane for use as a catalyst killer.

Surprisingly, at a mixture of water and GMO at a weight ratio of $H_2O$/GMO of 1:20 can be solubilized completely by the GMO, forming a clear solution.

This solution remains clear when diluting the $H_2O$/GMO mix with solvent. The solution preferably contains from 50 to 95 wt % of solvent. The solution may be stable at ambient temperatures.

For appropriate polymerisation processes from 2 to 8% of water and 98 to 92% of GMO or SMO by weight of water and GMO/SMO may be used. The amount of GMO or SMO can be reduced for high comonomer polymerisation.

The process may be used for polymerising ethylene or higher olefins such as propylene, 1-butylene with or without modifier such as $H_2$, with or without higher molecular weight comonomers such as propylene, butylene and/or other ethylenically unsaturated comonomers having from 3 to 20 carbon atoms, preferably having up to 10 carbon atoms. The high catalyst activity which is preserved by the process of the invention also permits the incorporation of polyenes such as $C_4$ to $C_{12}$ dienes including butadiene, isoprene or 1,4 hexadiene which are not easily incorporated. The process also facilitates production of polymers containing high comonomer levels under economically viable conditions. Polymerisation conditions (temperature; pressure) may vary depending on the monomers and the desired polymer product characteristics. The invention is applicable wherever a direct monomer recycle without or with minor facilities for catalyst poison removal takes place in the polymerisation of olefins following a separation of a polymer/monomer mixture. Pressure may vary for example from 50 to 3500 bar.

Both aspects of the invention contribute to the establishment of controllable killing conditions with minimal impact on polymerisation.

The improved process conditions may lead to a more homogeneous polymer product and narrower molecular weight distribution. With narrower compositional distributions, narrow DSC melting peaks may be observed.

BRIEF DESCRIPTION OF THE DRAWINGS

FIG. 1 is a flow diagram for the introduction of catalyst kill agents into a polymerisation process.

EXAMPLES 1-7

The polymerizations in Examples 1 to 7 were carried out (See FIG. 1) in a high-pressure continuous polymer production facility, at reaction pressures ranging from 1300 bar to 1600 bar and a polymerisation reactor outlet temperature of from 140° to 220° C.

The facility has downstream of the polymerisation reactor 2 a letdown valve 4 for reducing the pressure. Downstream of the valve there is located a catalyst killer injection point 7. Heat exchangers 6 allow heating or cooling of the mixture emerging from reactor.

Downstream of the exchanger, there is provided a high pressure separator 8 (HPS) for separating the monomer/polymer mixture. The polymer rich phase is taken from the HPS for further processing; the monomer rich phase is recycled to the reactor via the high pressure recycle system 10 consisting of a series of coolers, polymer knockout vessels (for removing low molecular weight residues) and a high pressure compressor which supplies the monomer feed to the polymerisation reactor.

Fouling in the high pressure recycle system is monitored by measuring the pressure drop between the HPS and a suction (inlet) vessel of the high pressure compressor.

Post-reactions in the HPS are monitored by measuring the temperature between the monomer and polymer outlet of the HPS. This is referred to as the outlet temperature spread. It is assumed that the catalyst system in the polymer phase is deactivated sufficiently completely when the exothermic polymerisation is suppressed and the temperatures at both outlets are substantially the same.

Preparation of Catalyst Killer

Three catalyst killer mixtures were prepared:

Recipe No 1 (a decomposable volatile killer component): Di-tert.butylperpivalate is diluted with iso-octane (Isopar C) to a 3 wt % solution.

Recipe No 2 (a non-volatile and a decomposable volatile killer component combination):

1 weight part of glycerol mono-oleate (GMO) is heated to 40° C. and diluted with 1 wt part of iso-octane. The mixture is agitated until a homogeneous solution is obtained. This solution is then blended with 8 wt parts of a premix of 3.1 wt % di-tert. butylperpivalate in iso-octane.

Recipe No 3 (a waterbased volatile/non-volatile catalyst system killer combination):

1 weight part of glycerol mono-oleate is diluted with 1 weight part of iso-octane and agitated at 40° C. Then 0.05 wt parts of demineralized water is added and the warm mixture is agitated until a clear solution is obtained. This solution then is diluted further by adding 8 wt parts of iso-octane.

of alumoxane. Polymerization conditions were changed from 160° to 220° C. The catalyst activity varied in the course of polymerisation and was found to be in the range 10 to 20000 g PE/g Zr compound.

Waxes with a broad molecular weight distribution and strongly colored from yellow to black were obtained. The polymer outlet temperature at the high pressure separator was found to be 30° to 50° C. higher than the monomer outlet temperature, leading to the conclusion that substantial post-reactions take place in the HPS. Temperature spreads between the polymer and gas outlet as high as 80° C. were observed. Occasional black spots and cross-linked domains were found in the wax product.

Plugging was observed usually after a few hours in the complete recycle loop including in the reactor feed line.

EXAMPLE 2 (comparative)

Polymerisation conditions were as in example 1, but with approx 30 wt % propylene in reactor feed. Catalyst A was replaced by catalyst B. The same qualitative observations were made as described with example 1.

EXAMPLE 3 (comparative)

Propylene was used as comonomer with ethylene. Feed composition was varied in the range 70 to 85 wt % propylene, the reactor pressure was in the range 1300–1500 bar and the reaction temp. was varied from 140° to 160° C. Tertiary butyl perpivalate (Recipe 1) was added as a catalyst killer in a 0.06–0.10 mole ratio with respect to the total of aluminium and transition metal.

With increasing killer flow rate it was found that the

TABLE 1

Operating Experience with Different Catalyst Killers

| Example No | Comonomer/ Modifier (1) | Catalyst (2) | KILLER TYPE | KILLER Mole Ratio (3) | Reactor Outlet Temp. °C. | HPS Press. bar | HPS Offgas Temp °C. | HPS Outlet Temp. Spread, °C. | Induction Period for Polymerisation in recycle, hrs | CAT ACTIVITY gr polymer/ gr transition metal compound | POLYMER Appearance |
|---|---|---|---|---|---|---|---|---|---|---|---|
| 1 | Hydrogen | A | No 1 | 0.06/0 | 160–220 | 195–200 | 190–200 | >30 | | 10–20000 | Coloured, partly black |
| 2 | Hydrogen + Propylene | B | No 1 | 0.06/0 | 180 | 195–200 | 190–200 | >30 | | 10–20000 | Coloured partly black |
| 3 | Propylene | B | No 1 | 0.10 | 140–160 | 195–200 | 190–200 | 10–40 | 4–8 | 30–60000 | Grey, sticky |
| 4 | Propylene | B | No 2 | 0.08/0.16 | 140–160 | 195–200 | 190–200 | <5 | 4–8 | Max 280000 | Colourless, dry |
| 5 | Propylene | B | No 3 | 0.25/0.25 | 140–160 | 195–200 | 190–200 | <3 | >40 | Max 360000 | Colorless, dry |
| 6 | Hydrogen | B | No 3 | 0.15/0.15 | 160–180 | 195–200 | 190–200 | <10 | | >80000 | White |
| 7 | Butene-1 | B | No 3 | 0.18/0.18 | 140–160 | 195–200 | 190–200 | <3 | >80 | Max 230000 | Colourless, dry |

NOTES:
(1) Primary monomer is ethylene in all cases.
(2) Catalyst A = dicyclopentadiene zirconium dichloride
Catalyst B = dimethylsilyl bis tetrahydroindenyl zirconium dichloride
Cocatalyst in all cases methylaluminium oxane supplied by Schering AG, Bergkammen. Molar ratio aluminium/transition:metal compound = 100 in case of catalyst A and = 420 for catalyst B.
(3) Mol ratio volatile component to aluminum on left; Mol ratio non-volatile component to aluminum on right.

EXAMPLE 1 (comparative)

Ethylene was polymerized in the presence of 1 to 10 mol % hydrogen with catalyst A and a Al/Zr mole ratio of 100. Tertiary butyl perpivalate dissolved in iso-octane (Recipe 1) was used as catalyst killer. The killer/transition metal mole ratio was varied in a range from 3 to 6, equivalent to a killer/total metal mole ratio of 0.03 to 0.06. The total metal mole ratio is calculated on a combination of the molar amounts of Zr and the Al temperature increase in the high pressure separator could be reduced from typically 25° to 40° C. to not lower than typically 10°–20° C. Thus post reactions were taking place, as confirmed by GPC (gel permeation chromatography) to generate 2 to 5% of low molecular polymers which tend to bloom out of the polymer produced and create a sticky polymer surface. Usually changes in the killer flow rate were observed to affect the catalyst consumption (which is adjusted to obtain the desired equilibrium reaction temperature after a time period equivalent to the residence time of the monomer recycle system) indicating that killer or killer residues suppress or interfere with the action of the catalyst system.

The strongest impact on catalyst activity was observed at 0.10 killing ratio which indicates that significant quantities of killer components were carried over to the reactor. As a result fairly low catalyst activities were obtained causing a grey product colour.

Although catalyst poisons were apparently recycling to the reactor, polymer formation in the monomer recycle system was observed causing the pressure drop to increase after 4 to 8 hours from initially <15 bar to more than 20 bar. Polymers removed from the monomer recycle were found to be different from the reactor product in terms of molecular weight, molecular weight distribution and crystallinity indicating that these polymers have been generated locally by still active catalyst.

Increasing conventional killer concentrations did not permit a good compromise between the need to kill catalyst in the HPS and yet not interfere with catalyst activity in subsequent polymerisation.

EXAMPLE 4

Reaction conditions were similar to example 3. Glycerol mono-oleate according to recipe 2 was added to the killer component used in example 3. Compared to example 3 the post reactions in the separator were found to be substantially reduced as indicated by an HPS outlet spread of less than 5° C. at any killing ratio. The low molecular weight fraction of the polymer was decreased substantially and stickiness was greatly reduced.

The catalyst activity reached about 5 times the value of example 3 at equivalent perpivalate/total metal mole ratio of 0.07–0.08 and with the non-volatile GMO/total metal mole ratio at 0.14 to 0.16.

Similar to example 3 an increase of the pressure drop was observed after a few hours due to local polymerisation.

EXAMPLE 5

The reaction conditions were similar to examples 3 and 4. The catalyst killer had been prepared by dissolving GMO and water in approximately a 1:1 mole ratio according to recipe 3. The killer flow rate was adjusted to a point such that an impact on catalyst activity just became apparent.

It was found that substantially higher molar quantities of volatile killer could be injected as compared to example 3 and 4 without negatively affecting the catalyst activity. The catalyst activity reached a value of 360.000 g PE/g Zr metallocene compound. Post-reaction in the HPS appeared essentially eliminated.

EXAMPLE 6

Polymerisation conditions similar to example 1, but employing a catalyst of type B and killer Recipe 3 were used instead of catalyst A and killer recipe nr 1. The monomer was ethylene only with $H_2$ as modifier to reduce the molecular weight. Post reaction in the HPS was reduced by a factor of 3 to 10 relative to Example 1 depending on catalyst killer ratio. No temperature runaway reaction were observed at any liquid level up in the HPS. Polymer present in recycle coolers exhibited a lower viscosity than the wax product suggesting that these are low molecular weight products extracted from the HPS and not polymer formed in situ in the coolers from monomer and still active residual catalyst. Catalyst activity was at least 4 times as high as during the runs described under example 1. The wax product was completely white.

EXAMPLE 7

At reaction conditions similar to example 3 propylene was replaced by butene-1. The same catalyst killer formulation was applied as with example 5, i.e. GMO and $H_2O$ in a 1:1 mole ratio. Slight losses in catalyst activity became apparent at somewhat lower killing ratios than with propylene in example 5. Polymerisation in the recycle system was not observed after running a continuous polymerisation for 80 hours. High catalyst activity was observed.

EXAMPLES 8–14

Recipe No. 4

15 to 25 gr of GMO is dissolved into 5 Ltr. of Isopar C at 40° C. Then 50 ml $H_2O$ are added under intensive agitation forming an unstable emulsion. The emulsion is kept in an agitated vessel and is transferred to the high pressure metering pump by means of a pump-around system in order to maintain constant composition during injection.

Recipe No. 5

Same as recipe No. 4 except that 15 gr of Sorbitol monoleate is used in place of GMO.

Recipe No. 6

Pure water.

EXAMPLES 8 and 9

Ethylene and an excess of butene-1 were copolymerized with a catalyst B and a commercially available MAO, delivered by Schering, Bergkamen, in a molar aluminum/transition metal ratio Al/TM=420. Initially a catalyst killer according to recipe No. 3 was injected at a relatively low molar ratio $H_2O$:GMO:Al 0.06:0.06:1.

Post reaction in the high pressure separator at these conditions were negligible (Example 8).

While maintaining constant reaction conditions the killer No. 3 was replaced by pure water dispersed into an aromatic carrier fluid with density close to the density of water. The killer injection rate was increased successively until a level was reached where the post reactions in the HPS stopped. Over a 2 hours time period the catalyst consumption was found to decrease steadily and to level out at less than half of the original consumption, equivalent to more than twice the original catalyst productivity (Example 9).

EXAMPLE 10

Example 10 represents running conditions over several to more than 100 hours of prolonged uninterrupted polymerization using different batches of commercially available MAO from Schering, Bergkamen. Unconverted TMA in the MAO's ranged from 0.25 mole TMA/mol Al to 0.46 mol/mole.

The $H_2O$/Al ratio was optimized by varying the killer injection rate until catalyst productivity started to decrease. $H_2O$/Al ratios of 0.9 mole/mole were possible in continuous operation with the 25% TMA containing MAO; the $H_2O$/Al ratio was 1.2 with the TMA rich MAO.

EXAMPLE 11, 12

Example 11 and 12 are polymerization runs with hexene-1 being used as comonomer.

The catalyst formulation is the same as in the previous examples.

EXAMPLE 13

The transition metal compound was di-(methylcyclopentadiene) zirconiumdichloride to provide low molecular weight polymer. Cocatalyst is as in the previous examples.

EXAMPLE 14

As a catalyst system a bridged mono-Cp transition metallocene compound and a MAO with 15% unconverted TMA was used. The metallocene has the general formula:

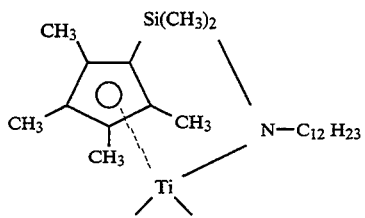

Where $C_{12}H_{23}$ is a single $C_{12}$ alicyclic ring

EXAMPLE 15, 16

These Examples are performed on a different apparatus with addition of a non-volatile killer (water) only inside the reactor upstream of the let-down valve.

The reactor arrangement was as follows:

A reactor has a stirrer and is divided in its reactor interior into zones. A gap is provided between the zones which governs the extent of backflow between the zones.

Monomer fed is fed principally to the initial part of the reactor, but minor amounts are fed downstream to complete the polymerization reaction. Water is injected in the final zone which is referred to as the killing zone.

For the test performed which are summarised in Table 1 a 50/50 mol % monomer/comonomer mixture was introduced without hydrogen as transfer agent using the comonomers indicated in Table 1. The temperature of the feed introduced was 50° C. A total residence time was approximately 100 seconds, of which 15 seconds in the killing zone was provided.

Catalyst in the form of metallocene and cocatalyst was introduced upstream of the killing zone. Metallocene selection was as set out in Table 2. The Al/TM ratio was as set out in Table 2. The MAO used was obtained by ageing a 30 wt % MAO solution in toluene and diluting it with Isopar C (Registered TradeMark) to give an ultimate 7 wt % concentration of MAO in slurry form in a toluene/Isopar C blend.

Water was injected into the final killing zone until a light decrease in catalyst system productivity (the inverse of catalyst consumption) was noted. In Example 15 polymerisation conditions stabilised at a catalyst consumption of 0.00053 wt parts of solution per 1 wt part of monomer feed. The water addition stabilised at 0.4 g $H_2O$ per g of MAO.

The temperature in the killing zone was from 180° to 190° C. gave a conversion of 11-12 wt % of the monomer/comonomer feed into polymer.

Approximately 9-10 wt ppm of water was present in the recycled feed suggesting that approximately half of the water injected reacted with aluminium component and is removed with the polymer.

The polymer obtained had a MI of 4.5, a Mw of 70000, a density of 0.910 containing 11 wt % of butene-1 comonomer. The Mn/Mw ratio was 2.1 and a narrow compositional distribution resulted.

By optimising the run conditions lower water injection levels and higher metallocene activities can be obtained.

Advantages of this process include also that monomer flashed off in a low pressure separator can be easily purified by single-stage fractionation for removing waxes and be re-compressed without requiring removal of killer component. Also the monomer/comonomer feed may contain water.

TABLE 2

Examples 8 to 15

| Example No | Comonomer (1) | Metallocene/ Al/TM ratio | KILLER Recipe No | Mole Ratio $H_2O$/Al | Reactor Press. BAR | Reactor Outlet TEMP. | Polymer wt % Comonomer Incorporation |
|---|---|---|---|---|---|---|---|
| 8 | Butene-1 | B | 3 | 0.06 | 1300 | 180 | 12.5 |
| 9 | Butene-1 | B | 6 | 0.8-1.2 | 1300 | 180 | 12.4 |
| 10 | Butene-1 | B | 4/5 | 0.9-1.2 | 1300 | 175 | 11.0 |
| 11 | Hexene-1 Hydrogen | B | 5 | 0.8 | 1300 | 200 | 3 |
| 12 | Hexene-1 | B | 5 | 0.8 | 1350 | 170 | 14.0 |
| 13 | Butene-1 | C | 5 | 0.5 | 1350 | 160 | 45 |
| 14 | Butene-1 Hydrogen | D | 4 | 0.7 | 1300 | 165 | 31 |
| 15 | Butene-1 | B-1 | 6 | 1.0-1.3 | 1300 | 190 | 10.8 |

| Example No | Polymer Melt Index gr/10 min 2.16 hl/190° C. | Polymer Viscosity CP at 140° C. | HPS Temp. Spread °C. | Recycle Fouling | Catalyst Activity gr PE/ gr TM Comp. |
|---|---|---|---|---|---|
| 8 | 5.5 | | N/D | | 47 000 |
| 9 | 4.8 | | N/D | N/D | 105 000 |
| 10 | 2.5-4 | | N/D | N/D | 100-350 000 |
| 11 | 10 | | N/D | N/D | 150 000 |
| 12 | 2.0 | | N/D | N/D | >250 000 |
| 13 | — | 400 | N/D | N/D | 70 000 |

TABLE 2-continued

| Examples 8 to 15 | | | | |
|---|---|---|---|---|
| 14 | 10 | N/D | N/D | 50 000 |
| 15 | 4.5 | N/D | N/D | 400–800 000 |

N/D = NOT DETECTABLE.
B = dimethylsilyl tetrahydroindenyl zirconium dichloride at Al/Zr mole ratio of 420.
D = See text for metallocene, at Al/Zr mole ratio of 1400.
C = See text for metallocene, at Al/Zr mole ratio of 400.
B-1 = As B but at Al/Zr mole ratio of 1000.

What is claimed is:

1. Process for preparing olefinic polymers comprising the steps of:
   (a) continuously feeding olefinic monomer and a catalyst system of a metallocene component and a cocatalyst component to a reactor;
   (b) continuously polymerising the monomer in the reactor under elevated pressure in a polymerisation zone;
   (c) continuously removing a monomer/polymer mixture from the reactor;
   (d) continuously separating inonomer from polymer to form a monomer-rich and a polymer-rich phase; and
   (e) recycling separated monomer to the reactor, said process being characterised in that:
   (f) a volatile catalyst system killer component and a non-volatile catalyst system killer component are added to suppress polymerisation outside of the polymerisation zone.

2. Process according to claim 1 in which the non-volatile killer component is added in a molar ratio of from 0.01 to 10 of non-volatile killer component per mol of metal (metallocene and cocatalyst).

3. Process according to claim 1 or 2 in which the non-volatile killer component is an oxygen containing compound.

4. Process according to claim 1 or 2 in which the volatile killer component is water.

5. Process according to claim 1 in which the volatile and non-volatile components are mixed for common introduction, preferably in the form of a solution or emulsion which may be formed with the aid of additional solvent.

6. Process according to claim 1 in which at least the volatile component is added in a killer reaction zone upstream of a high pressure letdown valve.

7. Process for preparing olefinic polymers comprising the steps of:
   (a) continuously feeding olefinic monomer and a catalyst system of a metallocene component and a cocatalyst component to a reactor;
   (b) continuously polymerising the monomer in a polymerisation zone in the reactor under elevated pressure;
   (c) continuously removing a monomer/polymer mixture from the reactor;
   (d) continuously separating monomer from molten polymer at a reduced pressure; and
   (e) recycling separated monomer to the reactor, characterised in that:
   (f) water is added as a volatile catalyst system killer component to suppress polymerisation outside of the polymerisation zone.

8. Process according to claim 7 in which the cocatalyst component includes an aluminum alkyl capable of hydrolising with excess water to produce alumoxane.

9. Process according to claims 7 or 8 in which there is no addition of a non-volatile catalyst system killer component.

10. Process according to claim 7 in which water is added in amounts such that the catalyst system is killed sufficiently to permit polymer separation, unreacted water being recycled with separated monomer.

11. Process according to claim 7 in which water is added into a killer reaction zone upstream of a high pressure let-down valve or downstream of a high pressure let-down valve.

12. Process according to claim 11 in which the killer reaction zone is defined by a baffle in a high pressure reaction vessel with a polymerization zone upstream of the killing reaction zone and is upstream of the pressure let-down valve.

13. Process according to claim 7 in which monomer and residual water are removed from a low pressure separator and recycled from the low pressure separator without additional separate water removal for feeding to the reactor.

14. Process according to claims 1 or 7 in which the metallocene is used in an amount of 0.01 to 100 g of metallocene per $10^6$ g of monomer.

15. Process according to claim 8 in which water is added as a catalyst system killer component at a molar ratio of 0.005 to 2.5 mole of water per mol of total metal in the catalyst system.

16. Process according to claim 1 in which the volatile killer component and non-volatile killer component are added downstream of the polymerization zone and upstream of a means for separating monomer from molten polymer.

17. Process according to claim 2 in which the non-volatile killer component is added in a molar ratio of from 0.05 to 2 of non-volatile killer component per mol of total metal in the catalyst system.

18. Process according to claim 5 in which the mixture of volatile and non-volatile components is introduced downstream of a high-pressure let-down valve.

19. Process according to claim 18 in which the mixture of volatile and non-volatile components is introduced upstream of a high pressure separating stage.

20. Process according to claim 7 in which the water is added downstream of the polymerization zone and upstream of a means for separating monomer from molten polymer.

21. Process according to claim 10 in which the catalyst system contains a component capable of reacting with unreacted water.

22. Process according to claim 14 in which the metallocene is used in an amount of from 0.1 to 10 g/$10^6$ g of polymer.

23. Process according to claim 15 in which the water is added at a molar ratio of 0.05 to 1.5 mol of water per mol of total metal in the catalyst system.

24. Process for preparing olefinic polymers comprising the steps of:

(a) feeding olefinic monomer and a catalyst system of a metallocene component and a cocatalyst component to a reactor;
(b) polymerising the monomer in the reactor under elevated pressure in a polymerisation zone;
(c) removing a monomer/polymer mixture from the reactor;
(d) separating monomer from polymer to form a monomer-rich and a polymer-rich phase; and
(e) recycling separated monomer to the reactor, said process being characterised in that:
(f) a volatile catalyst system killer component and a non-volatile catalyst system killer component are added to kill polymerisation outside of the polymerisation zone.

25. Process for preparing olefinic polymers comprising the steps of:
(a) feeding olefinic monomer and a catalyst system of a metallocene component and a cocatalyst component to a reactor;
(b) polymerising the monomer in a polymerisation zone in the reactor under elevated pressure;
(c) removing a monomer/polymer mixture from the reactor;
(d) separating monomer from molten polymer at a reduced pressure; and
(e) recycling separated monomer to the reactor, characterised in that:

(f) water is added as a volatile catalyst system killer component to kill polymerisation outside of the polymerisation zone.

26. Process according to claim 3 in which the non-volatile killer component contains a terminal hydroxy group.

27. Process according to claim 1 in which the non-volatile killer component is a nitrogen containing compound.

28. Process according to claim 1 in which the non-volatile killer component is a sulfur containing compound.

29. Process according to claim 1 in which the non-volatile killer component has a molecular weight higher than 200.

30. Process according to claim 29 in which the non-volatile killer component has a molecular weight higher than 300.

31. Process according to claim 1 in which the volatile killer component is an oxygen containing compound.

32. Process according to claim 1 in which the volatile killer component is a nitrogen containing compound.

33. Process according to claim 1 in which the volatile killer component is a sulfur containing compound.

34. Process according to claim 1 in which the volatile killer component has a molecular weight less than 200.

35. Process according to claim 34 in which the volatile killer component has a molecular weight less than 80.

* * * * *